US012752544B2

(12) United States Patent
Hanano

(10) Patent No.: US 12,752,544 B2
(45) Date of Patent: Oct. 6, 2026

(54) CONTAINER HOUSING DEVICE AND INKJET RECORDING APPARATUS

(71) Applicant: KYOCERA Document Solutions Inc., Osaka (JP)

(72) Inventor: Susumu Hanano, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 130 days.

(21) Appl. No.: 18/786,037

(22) Filed: Jul. 26, 2024

(65) Prior Publication Data

US 2025/0042165 A1 Feb. 6, 2025

(30) Foreign Application Priority Data

Aug. 4, 2023 (JP) ................................ 2023-127919

(51) Int. Cl.
*B41J 2/175* (2006.01)
*B41J 29/13* (2006.01)

(52) U.S. Cl.
CPC ....... *B41J 2/17533* (2013.01); *B41J 2/17523* (2013.01); *B41J 29/13* (2013.01)

(58) Field of Classification Search
CPC .... B41J 2/17533; B41J 2/17523; B41J 29/13; B41J 2/17509; B41J 2/1752; B41J 2/17553; B41J 29/02; B41J 2/17503
See application file for complete search history.

(56) References Cited

U.S. PATENT DOCUMENTS

2007/0229623 A1* 10/2007 Kawamura ............ B41J 2/1752 347/86
2022/0404764 A1 12/2022 Abe

FOREIGN PATENT DOCUMENTS

JP 2022-191699 A 12/2022

* cited by examiner

*Primary Examiner* — Lisa Solomon
(74) *Attorney, Agent, or Firm* — Stein IP LLC

(57) ABSTRACT

A container housing device includes a device main body, a plurality of container housing portions, and a plurality of cover members. The plurality of container housing portions have openings adjacently juxtaposed in an up-down direction along a side surface of the device main body and each house an ink container filled with ink. The plurality of cover members are mounted to the device main body so as to be able to open and close the openings. Each of the cover members includes an inclined part inclined, in a downward direction toward a lower end thereof, from an outer side toward an inner side of a corresponding one of the container housing portions.

4 Claims, 8 Drawing Sheets

CONTAINER HOUSING DEVICE AND INKJET RECORDING APPARATUS

INCORPORATION BY REFERENCE

This application is based upon and claims the benefit of priority from Japanese Patent Application No. 2023-127919 filed on Aug. 4, 2023, the entire contents of which are incorporated herein by reference.

BACKGROUND

The present disclosure relates to a container housing device and an inkjet recording apparatus.

As image forming apparatuses such as a printer and a copy machine, inkjet recording apparatuses that eject ink onto recording media such as paper so as to record images thereon are capable of recording high-definition images and thus have been widely used.

In most cases, such an inkjet recording apparatus includes a plurality of cover members constituting an outer casing of a main body thereof. Opening the cover members allows access to an interior of the inkjet recording apparatus. Thus, in the inkjet recording apparatus, it is possible, for example, to clear jamming of a recording sheet, to perform maintenance of the apparatus, and to perform replacement of an ink container that used to be filled with ink and has now run out of the ink.

SUMMARY

A container housing device according to an aspect of the present disclosure includes a device main body, a plurality of container housing portions, and a plurality of cover members. The plurality of container housing portions have openings adjacently juxtaposed in an up-down direction along a side surface of the device main body and each house an ink container filled with ink. The plurality of cover members are mounted to the device main body so as to be able to open and close the openings. Each of the plurality of cover members includes an inclined part inclined, in a downward direction toward a lower end thereof, from an outer side toward an inner side of a corresponding one of the plurality of container housing portions.

DETAILED DESCRIPTION

With reference to the appended drawings, the following describes an embodiment of the present disclosure. The present disclosure, however, is not limited to a configuration described below.

Figure 1:
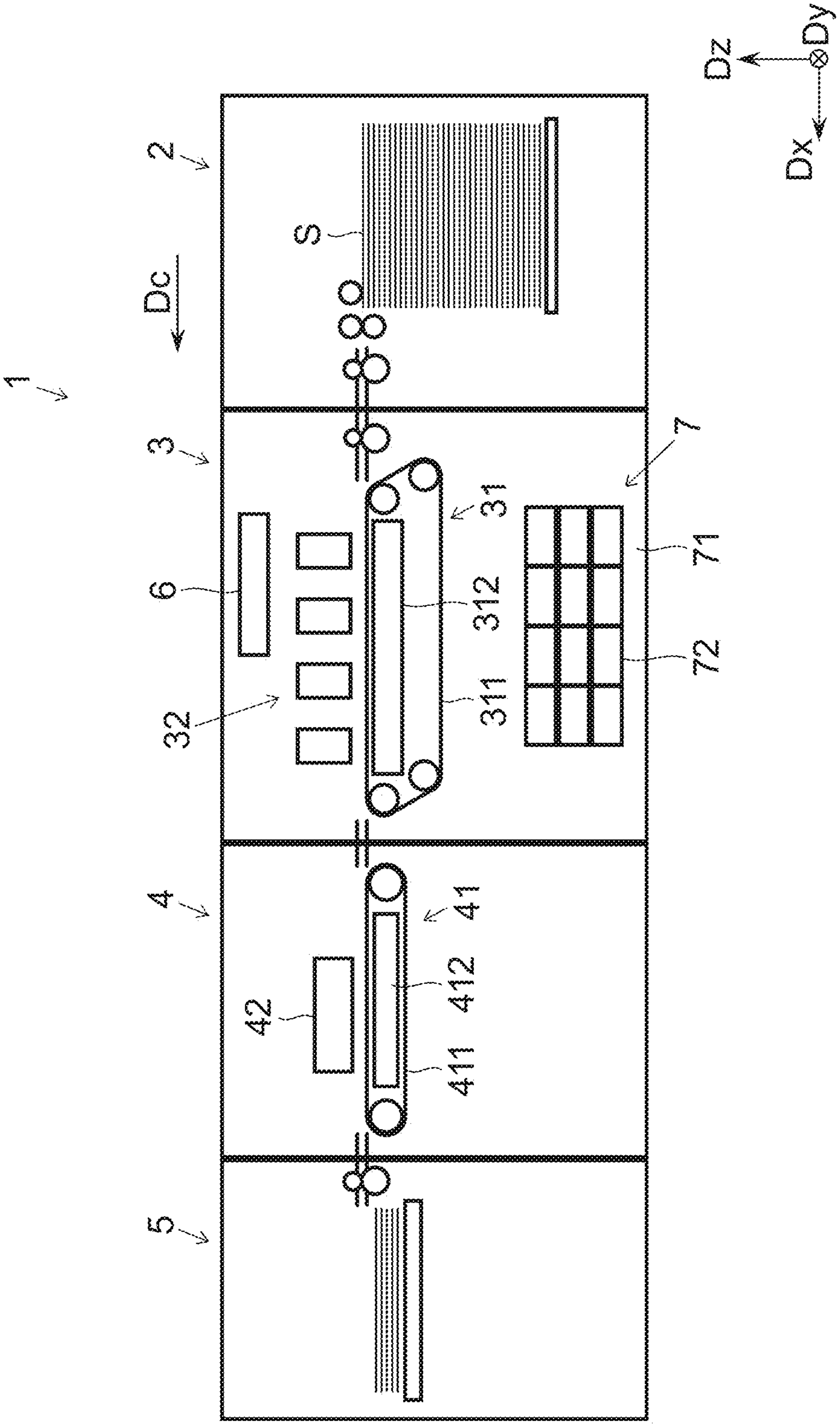
FIG. 1 is a schematic sectional front view of an inkjet recording apparatus according to an embodiment of the present disclosure.
Figure 2:
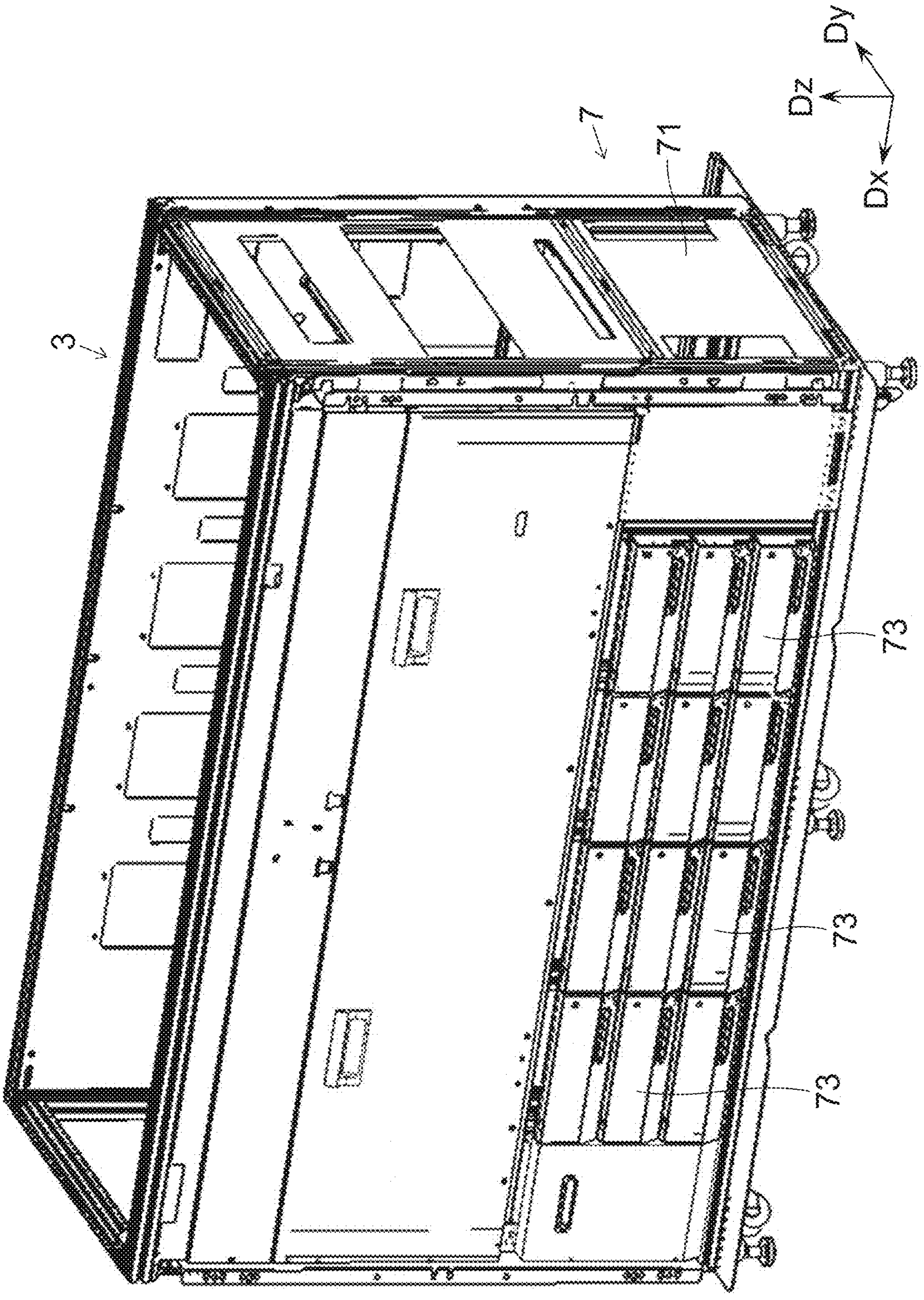
FIG. 2 is a perspective view of a recording portion of the inkjet recording apparatus shown in FIG. 1.

FIG. 1 is a schematic sectional front view of an inkjet recording apparatus 1 according to the embodiment. FIG. 2 is a perspective view of a recording portion 3 of the inkjet recording apparatus 1 shown in FIG. 1. In FIG. 2, some of constituent elements of the recording portion 3 may not be depicted. Furthermore, in the drawings referred to below, which include FIG. 1 and FIG. 2, arrows are appropriately depicted to indicate a left-right transverse direction Dx, a front-rear direction Dy, and an up-down direction Dz of the apparatus.

The inkjet recording apparatus 1 is, for example, an inkjet recording type printer. As shown in FIG. 1, the inkjet recording apparatus 1 includes a sheet supply portion 2, the recording portion 3, a drying portion 4, a sheet discharge portion 5, and a control portion 6.

In the inkjet recording apparatus 1, the sheet supply portion 2 is arranged most upstream in a sheet conveyance direction Dc. The sheet supply portion 2 contains a plurality of sheets (recording media) S and feeds them out one by one separately at the time of recording.

The recording portion 3 is connected downstream of the sheet supply portion 2 in the sheet conveyance direction De of the inkjet recording apparatus 1. The recording portion 3 includes a belt conveyance portion 31 and a recording unit 32.

The belt conveyance portion 31 includes a conveyance belt 311 formed in an endless shape and a sheet suction portion 312. The conveyance belt 311 has a plurality of holes (not shown) penetrating through front and back surfaces thereof. The sheet suction portion 312 is arranged inside a loop of the conveyance belt 311 adjacently to an upper part of the conveyance belt 311. The sheet suction portion 312 includes a suction portion (not shown) formed of a plurality of holes for sucking air downward formed through an upper surface thereof.

The belt conveyance portion 31 conveys the sheet S being held on an upper surface of the conveyance belt 311 under suction by the sheet suction portion 312. The belt conveyance portion 31 is arranged below the recording unit 32 so as to be opposed thereto and conveys the sheet S received from the sheet supply portion 2.

The recording unit 32 is arranged to be opposed to the belt conveyance portion 31. The recording unit 32 is arranged at a prescribed distance from and above the conveyance belt 311 so as to be opposed to the sheet S conveyed while being held under suction on the upper surface of the conveyance belt 311.

Figure 3:
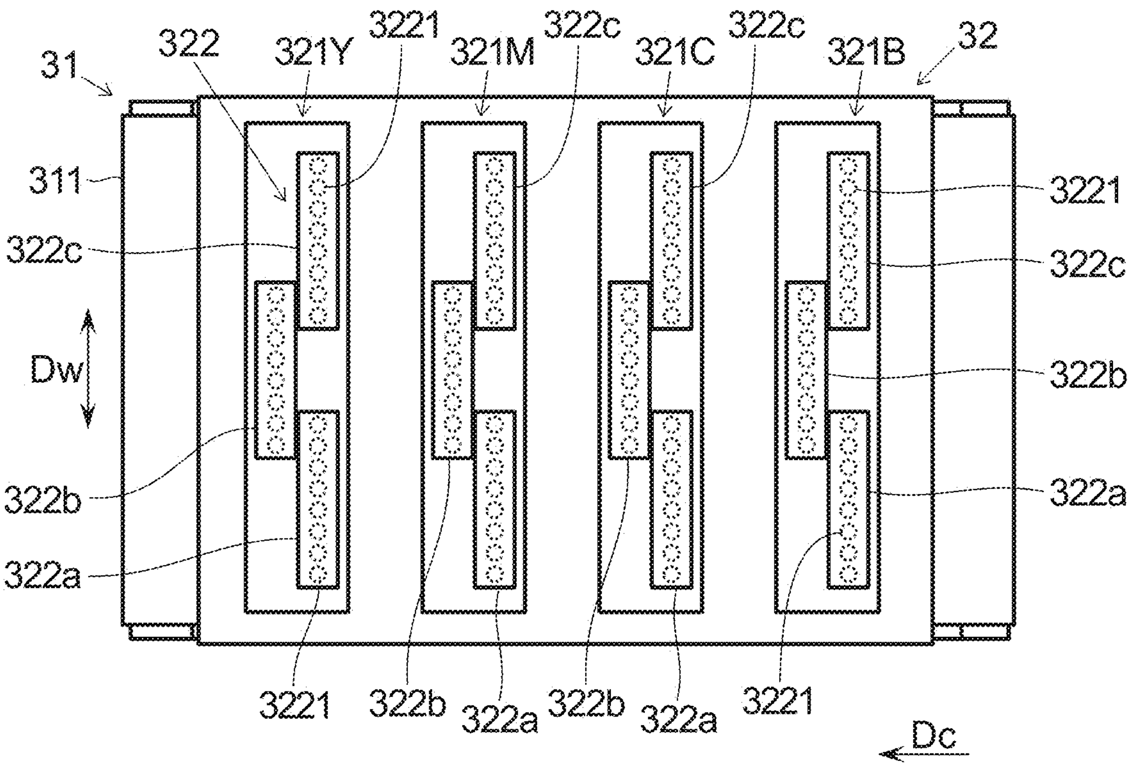
FIG. 3 is a plan view of a vicinity of a recording unit in the inkjet recording apparatus shown in FIG. 1.

FIG. 3 is a plan view of a vicinity of the recording unit 32 in the inkjet recording apparatus 1 shown in FIG. 1. As shown in FIG. 3, the recording unit 32 holds head units 321B, 321C, 321M, and 321Y corresponding to four different colors of black, cyan, magenta, and yellow, respectively. The head units 321B, 321C, 321M, and 321Y are juxtaposed along the sheet conveyance direction De so that longitudinal directions thereof are parallel to a sheet width direction Dw orthogonal to the sheet conveyance direction Dc. Since the four head units 321B, 321C, 321M, and 321Y are identical in basic configuration, in the following description, unless required to be particularly limited, identification symbols "B," "C," "M," and "Y" representing the respective colors may be omitted.

Each of the head units 321 of the respective colors includes a line inkjet recording head 322. In each of the head units 321 of the respective colors, a plurality of (for example, three (322*a*, 322*b*, and 322*c*)) recording heads 322 are arrayed in a staggered manner along the sheet width direction Dw.

The recording head 322 has a plurality of ink ejection nozzles 3221 provided at a bottom thereof. The plurality of ink ejection nozzles 3221 are arranged in line along the sheet width direction Dw, and ink can be ejected therethrough over an entire recording region on the sheet S. The recording unit 32 is configured to eject the ink sequentially from the recording heads 322 of each of the head units 321B, 321C, 321M, and 321Y of the four colors toward the sheet S being conveyed by the conveyance belt 311, thus recording a full-color image or a monochrome image on the sheet S.

Referring back to FIG. 1, the drying portion 4 is connected downstream of the recording portion 3 in the sheet conveyance direction De of the inkjet recording apparatus 1. The drying portion 4 includes a belt conveyance portion 41 and a heating unit 42.

The belt conveyance portion 41 includes a conveyance belt 411 formed in an endless shape and a sheet suction portion 412. The conveyance belt 411 has a plurality of holes (not shown) penetrating through front and back surfaces thereof. The sheet suction portion 412 is arranged inside a loop of the conveyance belt 411 adjacently to an upper part of the conveyance belt 411. The sheet suction portion 412 includes a suction portion (not shown) formed of a plurality of holes for sucking air downward formed through an upper surface thereof.

The belt conveyance portion 41 conveys the sheet S being held on an upper surface of the conveyance belt 411 under suction by the sheet suction portion 412. The belt conveyance portion 41 is arranged below the heating unit 42 so as to be opposed thereto and conveys the sheet S received from the sheet supply portion 2.

The heating unit 42 is arranged to be opposed to the belt conveyance portion 41. The heating unit 42 is arranged at a prescribed distance from and above the conveyance belt 411 so as to be opposed to the sheet S conveyed while being held under suction on the upper surface of the conveyance belt 411. The heating unit 42 includes a heat source for drying the sheet S by heat, such as, for example, a heater. In the drying portion 4, the sheet S on which an ink image has been recorded in the recording portion 3 is conveyed while being held under suction by the belt conveyance portion 41, and the ink of the ink image is dried while the sheet S is conveyed in this manner.

The sheet discharge portion 5 is connected downstream of the drying portion 4 in the sheet conveyance direction De of the inkjet recording apparatus 1. The sheet S on which the ink has been dried in the drying portion 4 and thus recording (printing) has been completed is conveyed to the sheet discharge portion 5. In the sheet discharge portion 5, the printed sheet (printed matter) is taken out from, for example, an upper or lateral side thereof.

The control portion 6 includes a CPU, a storage portion, and other electronic circuits and electronic components (none of these is shown). Based on control programs or data stored in the storage portion, the CPU controls operations of various constituent elements provided in the inkjet recording apparatus 1 so as to perform processes related to functions of the inkjet recording apparatus 1. The sheet supply portion 2, the recording portion 3, the drying portion 4, and the sheet discharge portion 5 each individually receive an instruction from the control portion 6 and cooperate to perform recording on the sheet S. The storage portion is composed of, for example, a combination of a non-volatile storage device such as a program ROM (read-only memory) or a data ROM and a volatile storage device such as a RAM (random-access memory).

The inkjet recording apparatus 1 further includes a container housing device 7 shown in FIG. 1 and FIG. 2. The container housing device 7 is configured on a lower side in the recording portion 3 integrally with the recording portion 3.

The container housing device 7 may be configured integrally with the inkjet recording apparatus 1 as in this embodiment or may be configured as an optional device mountable to and demountable from the inkjet recording apparatus 1.

Figure 4:
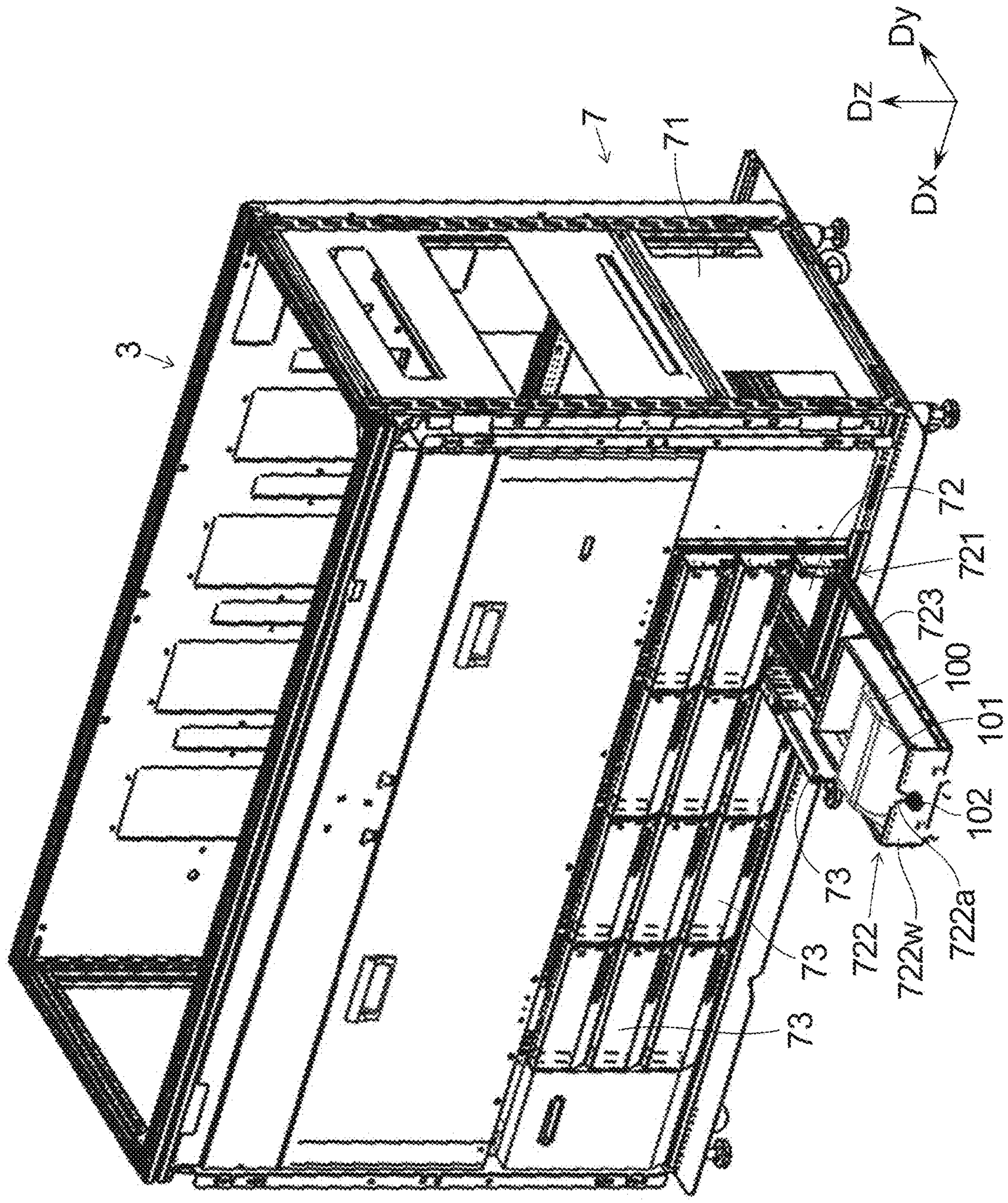
FIG. 4 is a perspective view of the recording portion shown in FIG. 2, illustrating a state where a tray has been pulled out from a container housing device.
Figure 5:
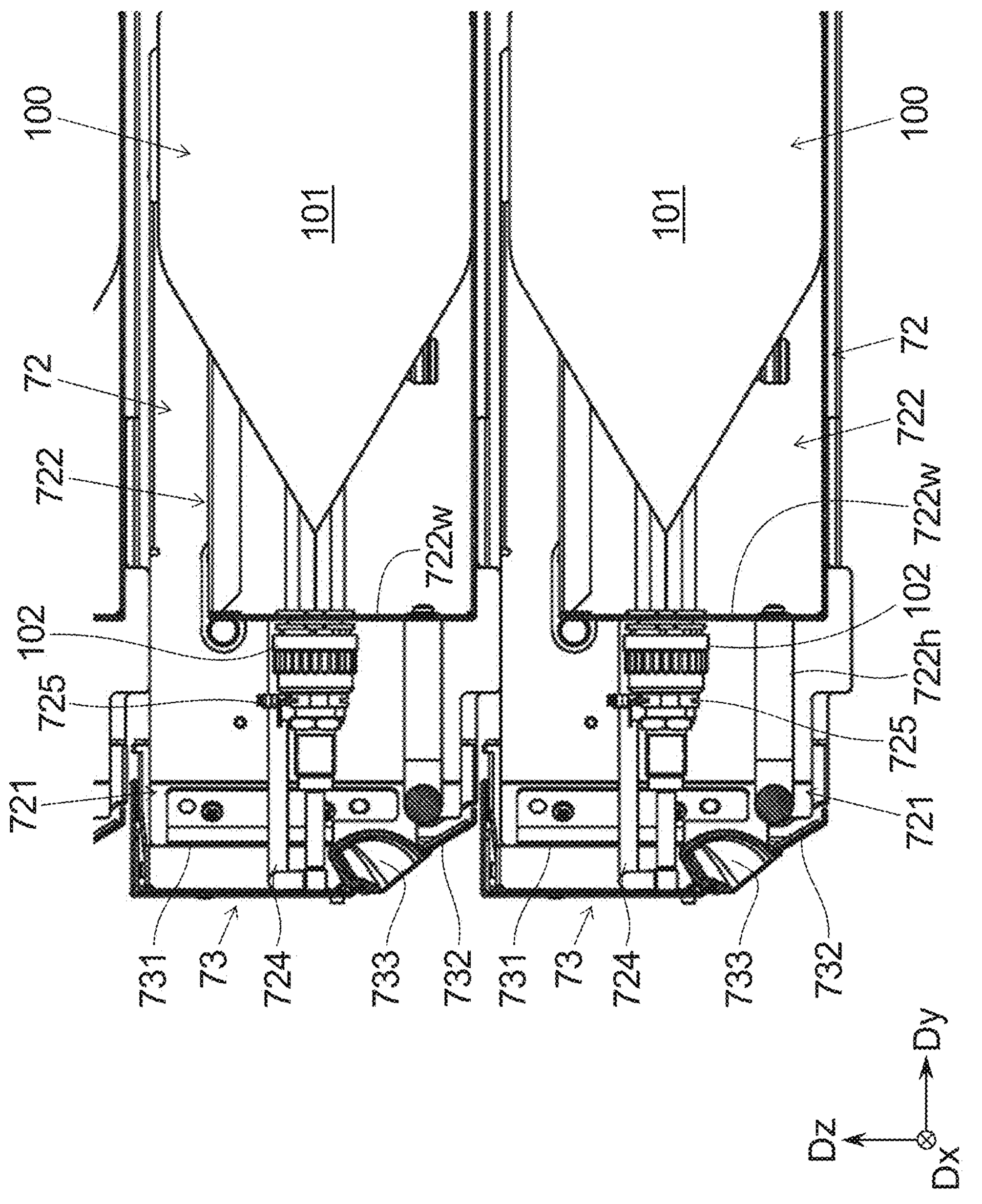
FIG. 5 is a sectional side view of the container housing device shown in FIG. 2.
Figure 6:
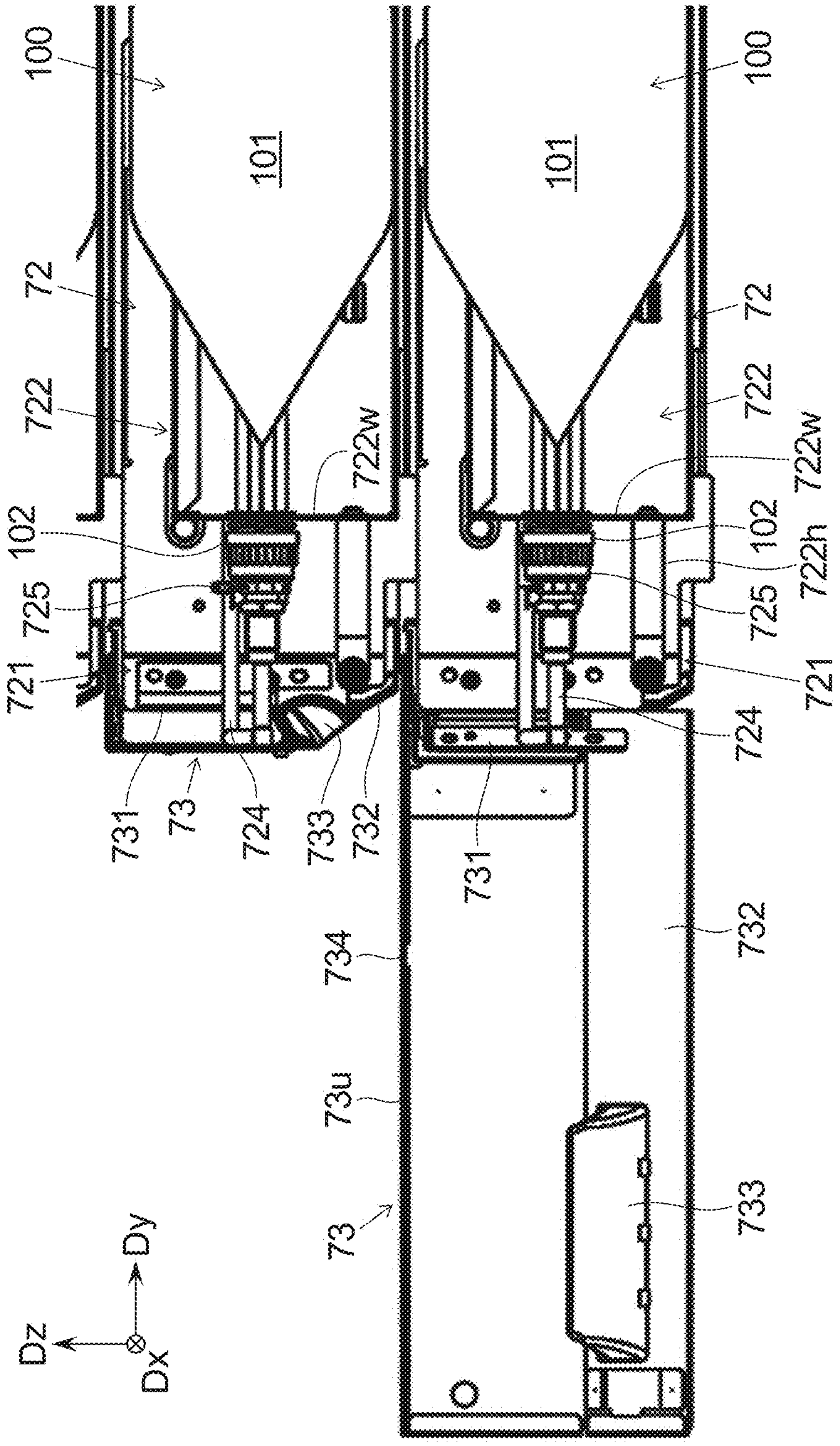
FIG. 6 is a sectional side view of the container housing device shown in FIG. 5, illustrating a state where a cover member has been opened.

FIG. 4 is a perspective view of the recording portion 3 shown in FIG. 2, illustrating a state where a tray has been pulled out from the container housing device 7. FIG. 5 is a sectional side view of the container housing device 7 shown in FIG. 2. FIG. 6 is a sectional side view of the container housing device 7 shown in FIG. 5, illustrating a state where a cover member has been opened. Similarly to FIG. 2, in FIG. 4, some of the constituent elements of the recording portion 3 may not be depicted. Furthermore, FIG. 5 and FIG. 6 show a state where an after-mentioned joint 725 of the container housing device 7 is connected to a cap 102 of each ink container 100.

As shown in FIG. 2 and FIG. 4, the container housing device 7 is arranged on the lower side in the recording portion 3. The container housing device 7 houses a plurality of ink containers 100 filled with the ink to be supplied to the recording portion 3. The container housing device 7 includes, in a device main body 71 thereof, a plurality of container housing portions 72 and a plurality of cover members 73.

The plurality of container housing portions 72 are adjacently juxtaposed in an up-down direction and in a horizontal direction. In this embodiment, the container housing device 7 includes 12 container housing portions 72. The 12 container housing portions 72 are adjacently arranged in four columns in the left-right transverse direction Dx and in three rows in the up-down direction Dz.

The container housing portions 72 each include a substantially rectangular parallelepiped-shaped internal space extending in the front-rear direction Dy of the device main body 71. The container housing portions 72 house, in such internal spaces, the ink containers 100 filled with the ink. Each of the plurality of container housing portions 72 has an opening 721 provided at a front edge thereof and communicating with the exterior. These plurality of openings 721 are adjacently juxtaposed in the up-down direction and in the horizontal direction along a side surface (at a front) of the device main body 71. The ink containers 100 are loadable in and unloadable from the container housing portions 72 via the openings 721.

The plurality of cover members 73 are arranged to be opposed to the respective openings 721 of the plurality of container housing portions 72. The cover members 73 each have a rectangular shape substantially identical in size to the opening 721 in a frontal view and are formed in a rectangular parallelepiped shape. The cover members 73 each include a hinge 731 and an inclined part 732.

The hinge 731 is arranged at one end (for example, a left end) of each of the cover members 73 in the left-right transverse direction Dx. The hinge 731 connects the device main body 71 to each of the cover members 73. With respect to the device main body 71, the hinge 731 allows each of the cover members 73 to rotate about a rotation axis extending in the up-down direction Dz. Thus, the plurality of cover members 73 are mounted to the device main body 71 so as to be able to open and close the openings 721.

The inclined part 732 is arranged at a frontal lower part of each of the cover members 73. The inclined part 732 is formed adjacently to a lower end of each of the cover members 73 so as to extend upward from the lower end. An upper edge of the inclined part 732 is positioned below a center of each of the cover members 73 in the up-down direction Dz. The inclined part 732 extends over an entire region of each of the cover members 73 in the left-right transverse direction Dx.

The inclined part 732 is inclined, in a downward direction toward a lower end thereof, from an outer side toward an inner side of each of the container housing portions 72. In this embodiment, the inclined part 732 is inclined, in the downward direction toward the lower end thereof, from a front toward a rear of the container housing device 7. In other words, the cover members 73 are each recessed in a vicinity of the lower end thereof so as to be inclined toward the inner side (a rear side) of a corresponding one of the container housing portions 72.

According to the above-described configuration, as shown in FIG. 6, when a lower one of each pair of vertically adjacent cover members 73 is opened, it is possible to easily view a state of a vicinity area of the opening 721 in a lower one of a corresponding pair of vertically adjacent container housing portions 72. That is, in the container housing device 7, it is facilitated, via the inclined part 732, to view an area below each of the cover members 73. Accordingly, in the container housing device 7, viewability of a lower part of the device can be improved, and thus it becomes possible to easily perform replacement of the ink containers 100.

Furthermore, the container housing portions 72 each include a tray 722, a slide rail 723, an ink tube 724, and the joint 725.

The ink containers 100 housed in the container housing portions 72 each include a container main body 101 and the cap 102. The container main body 101 is formed of, for example, a laminated film that is a flexible film and is filled inside with the ink. The container main body 101 is, for example, a so-called gusseted bag having side surfaces serving as gussets (folded parts) for imparting a thickness to the container main body 101. The cap 102 is arranged at one end of the container main body 101. The cap 102 includes an ink flow path allowing communication between an interior and an exterior of the container main body 101, thus functioning as an ink outflow port of each of the ink containers 100.

The tray 722 is arranged in each of the container housing portions 72. The tray 722 is formed in a rectangular parallelepiped box shape having an open upper surface. A handle **722*h* is mounted to a front of the tray 722. The ink containers 100 are each loaded from an upper surface opening of the tray 722 into an internal space thereof. The tray 722 has a cap insertion portion 722*a***.

The cap insertion portion **722*a* is formed in a front wall 722*w* of the tray 722. The front wall 722*w* of the tray 722 extends in the left-right transverse direction Dx and in the up-down direction Dz. The cap insertion portion 722*a* is configured as a slot extending over a prescribed length downward from an upper edge of the front wall 722*w***.

In housing the ink containers 100 in the container housing portions 72, the cap 102 of each of the ink containers 100 is inserted from above into the cap insertion portion **722*a*. The cap 102 is inserted into the cap insertion portion 722*a* so that the ink outflow port is directed to a front side (forward) of the tray 722**.

A pair of slide rails 723 is arranged on both left and right sides of the tray 722 in a frontal view of each of the container housing portions 72. The pair of slide rails 723 is arranged between inner side surfaces of each of the container housing portions 72 and outer side surfaces of the tray 722, and in the left-right transverse direction Dx, the slide rails 723 are opposed to each other via the tray 722. The slide rails 723 are each composed of, for example, a secured rail mounted to each of the inner side surfaces of each of the container housing portions 72, a tip rail mounted to a corresponding one of the outer side surfaces of the tray 722, and an intermediate rail connected between the secured rail and the tip rail.

The slide rails 723 extend in an insertion direction in which the tray 722 is inserted into each of the container housing portions 72 and in a pull-out direction in which the tray 722 is pulled out therefrom, i.e., parallel to the front-rear direction Dy of the container housing device 7. A user grips the handle **722*h* at the front of the tray 722 to slide the tray 722 in the insertion direction and in the pull-out direction. That is, the slide rails 723 hold the tray 722 so that the tray 722** is slidable in the insertion direction and in the pull-out direction.

The ink tube 724 is arranged in each of the container housing portions 72. The ink tube 724 extends from inside the device main body 71 toward the opening 721. The ink tube 724 is formed of, for example, a flexible synthetic resin tube and is connected at one end to the recording head 322 via a suction pump and a sub-ink tank (neither of these is shown). The joint 725 is provided at the other end of the ink tube 724. The ink filled in each of the ink containers 100 flows in the ink tube 724.

The joint 725 is provided at an end of the ink tube 724 extending from inside the device main body 71. The joint 725 includes an ink flow path allowing communication between an interior and an exterior of the ink tube 724, thus functioning as an ink inflow port of each of the ink containers 100. The joint 725 is mountably and demountably connected to the cap 102 of each of the ink containers 100 loaded in the tray 722.

Further, as shown in FIG. 5 and FIG. 6, the joint 725 is arranged on an inner side of and adjacently to each of the cover members 73. According to this configuration, since the cover members 73 each include the inclined part 732, when a lower one of each pair of vertically adjacent cover members 73 is opened, it is possible to easily view a state of the joint 725 in a lower one of a corresponding pair of vertically adjacent container housing portions 72. This improves workability in mounting the joint 725 to the cap 102 of each of the ink containers 100 and in demounting the joint 725 therefrom. As a result, it becomes possible to easily perform replacement of the ink containers 100.

Furthermore, the inclined part 732 of each of the cover members 73 includes a recessed handle 733. The recessed handle 733 is formed in a concave shape recessed inwardly from an outer surface of the inclined part 732. In other words, the recessed handle 733 is recessed from an outer side (a front side) of each of the cover members 73 toward the inner side (the rear side) of a corresponding one of the container housing portions 72. Furthermore, to be more specific, in each of the cover members 73, the hinge 731 is arranged at one end (a left end) thereof and the recessed handle 733 is arranged closer to the opposite other end (a right end) thereof in the left-right transverse direction Dx.

According to the above-described configuration, a user hooks his/her finger on the recessed handle 733 and thus can easily open and close any of the cover members 73. This can improve workability in replacement of the ink containers 100. Furthermore, the recessed handle 733 is provided in the inclined part 732 and thus can hardly be seen from above. Accordingly, it is possible to improve an external appearance of the container housing device 7.

Figure 7:
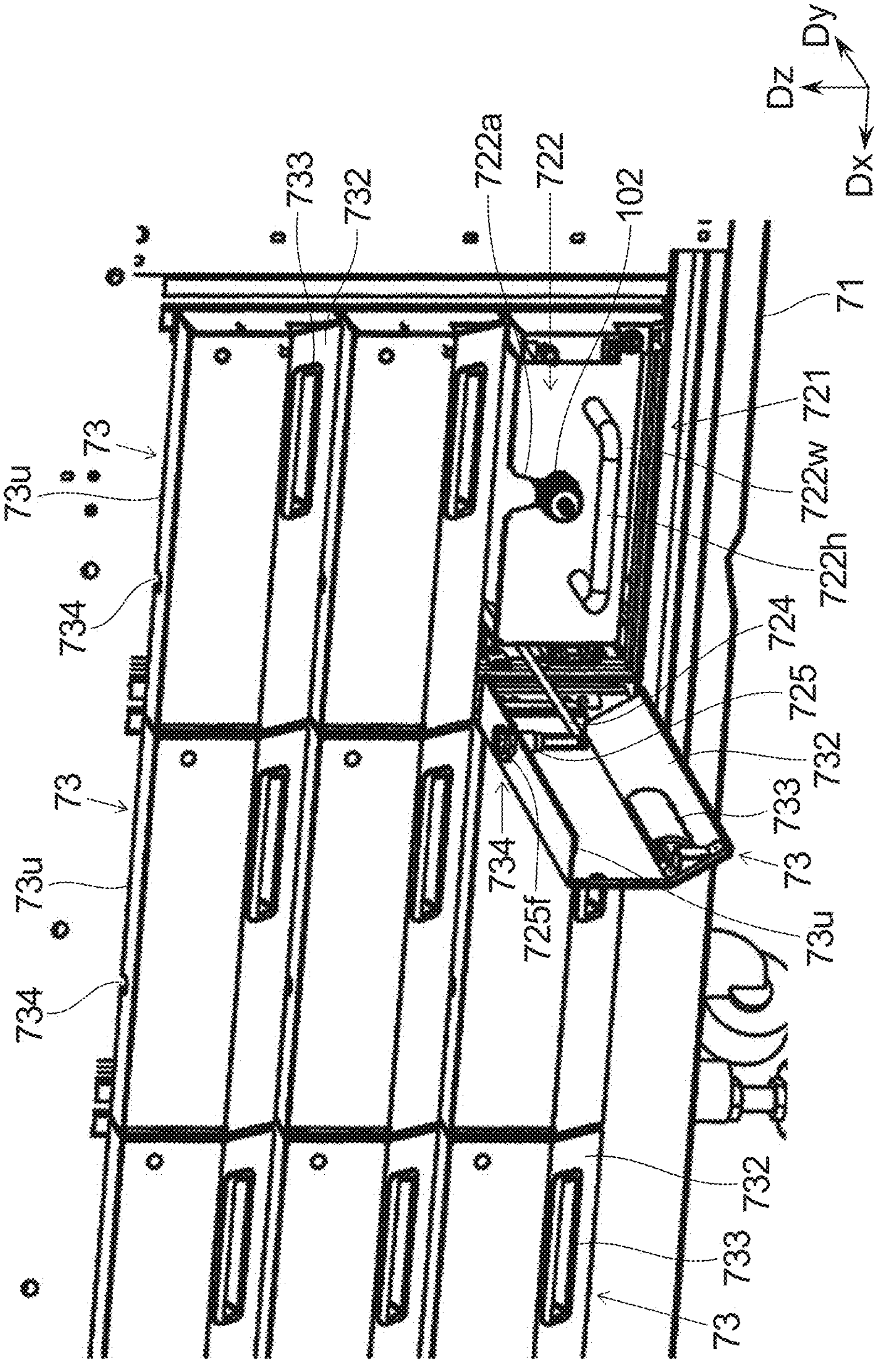
FIG. 7 is a partial perspective view of the container housing device shown in FIG. 5, illustrating the state where the cover member has been opened.
Figure 8:
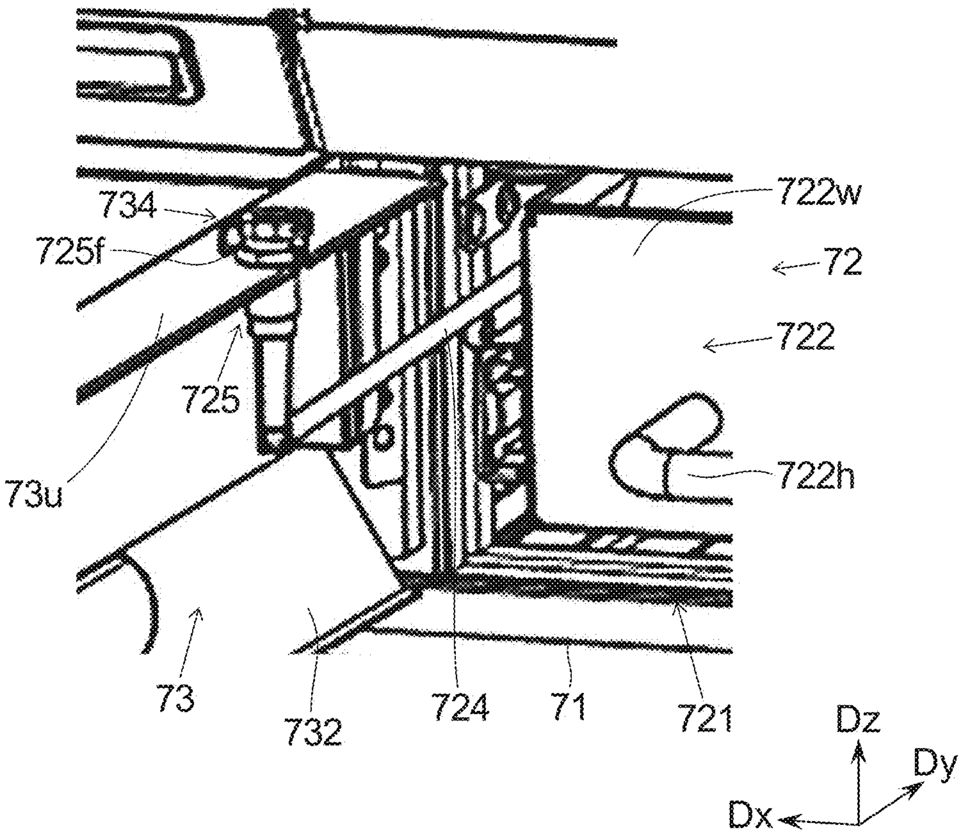
FIG. 8 is an enlarged perspective view of the container housing device shown in FIG. 7.

Furthermore, each of the cover members 73 includes a joint support 734. FIG. 7 is a partial perspective view of the container housing device 7 shown in FIG. 5, illustrating a state where one of the cover members 73 has been opened. FIG. 8 is an enlarged perspective view of the container housing device 7 shown in FIG. 7. FIG. 7 and FIG. 8 show a state where the joint 725 is disconnected from the cap 102.

The joint support 734 is formed in an upper surface 73*u* of each of the cover members 73. The upper surface 73*u* of each of the cover members 73 extends in the left-right transverse direction Dx and in the front-rear direction Dy. The joint support 734 is configured as a slot extending over a prescribed length from a rear-side edge of the upper surface 73*u* of each of the cover members 73 to the front side (forward) thereof.

In a state where one of the cover members 73 is opened, with the joint 725 disconnected from the cap 102, a user can insert the joint 725 into the joint support 734. The joint 725 is inserted into the joint support 734 so that the ink inflow port is directed upward.

The joint support 734 has a slot shape smaller in size than a flange 725*f* of the joint 725 inserted thereinto and supports the flange 725*f* from below. The joint 725 supported to the joint support 734 is prevented from falling from the upper surface 73*u* of each of the cover members 73. In this manner, the joint support 734 supports the joint 725 when disconnected from the cap 102.

According to the above-described configuration, the joint 725 before being connected to the cap 102 of each of the ink containers 100 or after being disconnected therefrom can be supported to the joint support 734. In the joint 725 supported to the joint support 734, the ink inflow port is directed upward, and thus the ink in the ink tube 724 can be prevented from spilling out. This makes it possible to suppress contamination of the container housing device 7 with the ink at the time of replacement of the ink containers 100.

While the foregoing has described the embodiment of the present disclosure, the present disclosure is not limited in scope thereto and can be implemented by adding various modifications thereto without departing from the spirit of the disclosure.

What is claimed is:

1. A container housing device, comprising:
a device main body;
a plurality of container housing portions that have openings adjacently juxtaposed in an up-down direction along a side surface of the device main body and each house an ink container filled with ink; and
a plurality of cover members that are mounted to the device main body so as to be able to open and close the openings,
wherein
each of the plurality of cover members includes an inclined part inclined, in a downward direction toward a lower end thereof, from an outer side toward an inner side of a corresponding one of the plurality of container housing portions,
each of the plurality of container housing portions includes:
a tray in which the ink container is loaded;
a slide rail that holds the tray so that the tray is slidable in an insertion direction and a pull-out direction thereof; and
a joint that is provided at an end of an ink tube extending from inside the device main body and is connected to a cap functioning as an ink outflow port of the ink container, and
the joint is arranged on an inner side of and adjacently to each of the plurality of cover members.

2. The container housing device according to claim 1, wherein
each of the plurality of cover members includes a joint support that supports the joint when disconnected from the cap.

3. The container housing device according to claim 1, wherein
the inclined part includes a recessed handle formed in a concave shape recessed inwardly from an outer surface of the inclined part.

4. An inkjet recording apparatus comprising the container housing device according to claim 1.

* * * * *